(12) United States Patent
Tarkin-Tas et al.

(10) Patent No.: US 10,662,288 B2
(45) Date of Patent: May 26, 2020

(54) DUAL FUNCTIONAL POLY(ARYLENE ETHER) COMPOUNDS

(71) Applicant: SABIC GLOBAL TECHNOLOGIES B.V., Bergen op Zoom (NL)

(72) Inventors: Eylem Tarkin-Tas, Delmar, NY (US); Huseyin Tas, Delmar, NY (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 16 days.

(21) Appl. No.: 16/255,470

(22) Filed: Jan. 23, 2019

(65) Prior Publication Data

US 2019/0225748 A1 Jul. 25, 2019

(30) Foreign Application Priority Data

Jan. 23, 2018 (EP) .................................... 18152920

(51) Int. Cl.
*C08G 65/48* (2006.01)
*C08G 65/44* (2006.01)
(Continued)

(52) U.S. Cl.
CPC ....... *C08G 65/485* (2013.01); *C08G 65/4068* (2013.01); *C08G 65/44* (2013.01); *C08G 65/48* (2013.01); *C08G 79/04* (2013.01)

(58) Field of Classification Search
USPC ........................................ 528/481, 482, 483
See application file for complete search history.

(56) References Cited

U.S. PATENT DOCUMENTS

| | | | |
|---|---|---|---|
| 5,159,075 A | 10/1992 | Phanstiel et al. | |
| 8,394,473 B2 | 3/2013 | Mccrea et al. | |
| 9,138,776 B2 | 9/2015 | Erretby et al. | |
| 9,199,434 B2 | 12/2015 | Mori et al. | |
| 9,212,425 B2 | 12/2015 | Eerden et al. | |
| 9,394,439 B2 | 7/2016 | Itoh et al. | |
| 9,399,712 B2 | 7/2016 | Li et al. | |
| 2005/0075426 A1 | 4/2005 | Campbell et al. | |
| 2005/0187373 A1 | 8/2005 | Yeager | |
| 2007/0082987 A1 | 4/2007 | Peters et al. | |
| 2010/0304065 A1 | 12/2010 | Tomantschger | |

(Continued)

FOREIGN PATENT DOCUMENTS

JP 5756699 B2 2/2013
KR 20160041355 A 4/2016

OTHER PUBLICATIONS

Extended European Search Report for Application No. 18152920.7, dated Jun. 22, 2018.

(Continued)

Primary Examiner — Terressa Boykin
(74) Attorney, Agent, or Firm — Cantor Cantor LLP

(57) ABSTRACT

A capped poly(arylene ether) copolymer having the formula wherein
Y is a divalent linking group of the formula each occurrence of D is independently a group of the formula each occurrence of Z is independently of the formula
(Continued)

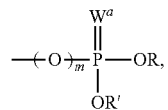

and
$Q^{1a}$, $Q^{1b}$, $R^1$, $R^2$, $R^3$, $R^4$, $R^5$, z, x, y, e, $R^a$, $R^b$, $R^c$, $R^d$, $R^e$, $W^a$, R, R', and m are as defined herein.

20 Claims, No Drawings

(51) Int. Cl.
    *C08G 65/40*      (2006.01)
    *C08G 79/04*      (2006.01)

(56) References Cited

U.S. PATENT DOCUMENTS

| | | |
|---|---|---|
| 2011/0316753 A1 | 12/2011 | Wu |
| 2012/0313826 A1 | 12/2012 | Wu |
| 2016/0130406 A1 | 5/2016 | Hsieh et al. |

OTHER PUBLICATIONS

Hwang et al., "Low Dielectric and Flame Retardant Properties of Thermosetting Redistributed Poly(Phenylene Oxide)", Journal of Vinyl & Additive Technology, 2009, 54-59.

DUAL FUNCTIONAL POLY(ARYLENE ETHER) COMPOUNDS

CROSS REFERENCE TO RELATED APPLICATIONS

This application claims priority to and the benefit of EP Application No. 18152920.7, filed Jan. 23, 2018, which is incorporated by reference herein in its entirety.

BACKGROUND

Poly(arylene ether) copolymers are a class of thermoplastics known for excellent water resistance, dimensional stability, and inherent flame retardancy, as well as outstanding dielectric properties over wide frequency and temperature ranges. Properties such as ductility, stiffness, chemical resistance, and heat resistance can be tailored by reacting thermosetting poly(arylene ether) copolymers with various crosslinking agents in order to meet requirements of a wide variety of end uses, for example, fluid engineering parts, electrical enclosures, automotive parts, and insulation for wire and cable. In particular, poly(arylene ether) copolymers have been used in thermoset compositions for electronics applications, where they provide improved toughness and dielectric properties, among other benefits.

Thermosetting poly(arylene ether) copolymers are telechelic, in that they are endcapped with reactive groups such as vinyl. Thermosetting poly(arylene ether) copolymers are often therefore referred to as "capped". Methods for the manufacture of capped poly(arylene ether) copolymers have been described, including methods to increase the flame retardancy by adding phosphorus containing compounds to curable compositions. However, while suitable for their intended purposes, there nonetheless remains a need for capped poly(arylene ether) copolymers that directly incorporate phosphorous into the copolymer. It would be an additional advantage if the phosphorous containing capped poly(arylene ether) copolymers could be prepared using processes that could be readily incorporated into known methods.

BRIEF DESCRIPTION

In an exemplary embodiments, a capped poly(arylene ether) copolymer has the formula:

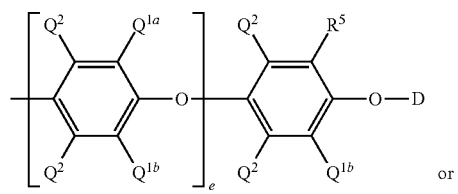

or

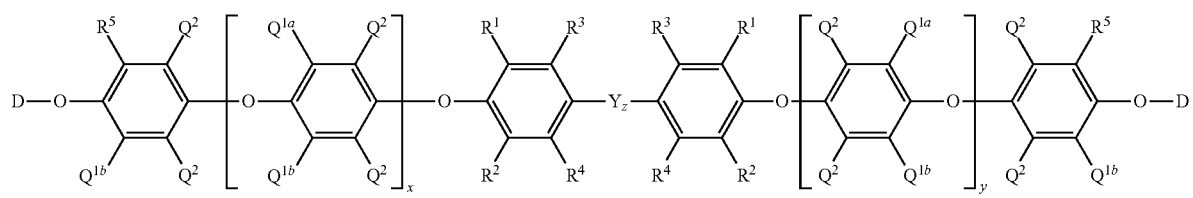

wherein $Q^{1a}$ is a $C_1$-$C_{12}$ primary or secondary alkyl; $Q^{1b}$ is halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Q^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $R^1$, $R^2$, $R^3$, and $R^4$ is independently hydrogen, halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $R^5$ is independently $Q^{1a}$ or a ($C_1$-$C_6$-hydrocarbyl)($C_1$-$C_6$-hydrocarbyl)aminomethylene group; z is 0 or 1; x and y represent the relative mole ratios of the arylene ether units wherein x and y are independently 0 to 50, or e is the number of moles of the arylene ether unit; Y is a divalent linking group of the formula

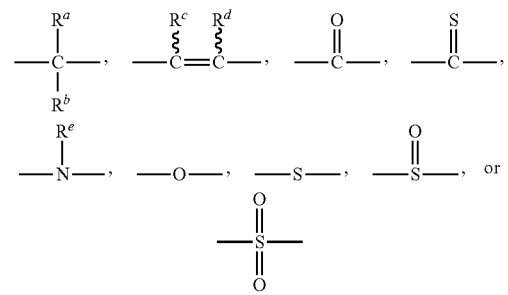

wherein each occurrence of $R^a$, $R^b$, $R^c$, $R^d$, and $R^e$ is independently hydrogen, $C_1$-$C_{12}$ hydrocarbyl, or $C_1$-$C_6$ hydrocarbylene, optionally wherein $R^a$ and $R^b$ or $R^c$ and $R^d$ together are a $C_4$-$C_8$ alkylene group; and each occurrence of D is independently a group of the formula

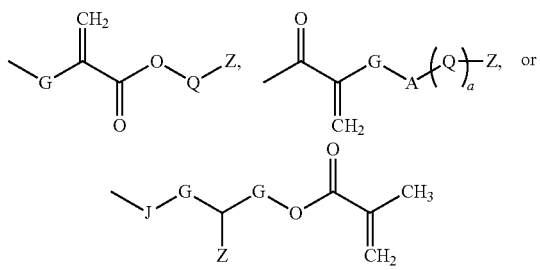

wherein each occurrence of G is independently $C_1$-$C_{12}$ hydrocarbylene; each occurrence of Q is independently $C_1$-$C_6$ alkylene or $C_6$-$C_{12}$ arylene, wherein a is 0 or 1; each occurrence of A is independently a single bond or —O—; each occurrence of J is independently a single bond, $C_1$-$C_6$ alkylene, or —$(CH_2)_n$NH$(CH_2)_n$(C=O)O— wherein n is 1 to 6; and each occurrence of Z is independently of the formula

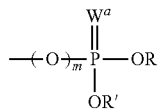

wherein $W^a$ is O or S; each of R and R' is independently hydrogen, $C_1$-$C_{12}$ hydrocarbyl, or $C_1$-$C_6$ hydrocarbylene, optionally wherein both R and R' together are a $C_2$-$C_8$ alkylene group; and m is 0 or 1.

In other exemplary embodiments, a process for forming the capped poly(arylene ether) copolymer is provided, the process comprising reacting a capping agent and an uncapped poly(arylene ether) copolymer comprising a phenolic end group under conditions effective to provide a reaction mixture comprising the capped poly(arylene ether) copolymer.

In yet another exemplary embodiment, a curable composition comprising a thermosetting resin and the capped poly(arylene ether) copolymer is provided.

In still another exemplary embodiment, a cured composition is obtained by heating the curable composition for a time and temperature sufficient to effect curing.

The above described and other features are exemplified by the following figures and detailed description.

DETAILED DESCRIPTION

For resin compositions containing poly(arylene ether) copolymers, the organic phosphate class of materials can be used as flame retardant additives. The organic phosphate is commonly an aromatic phosphate compound of the formula (X):

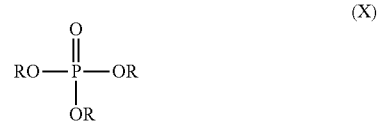

wherein R is the same or different and is alkyl, cycloalkyl, aryl, alklyenearyl, halogen substituted aryl, arylalkylene, halogen, or a combination thereof, provided at least one R is an aromatic group. However, aromatic phosphates can act as plasticizers and lower the glass transition temperature of compositions or migrate to the surface and leach out. This can limit the effectiveness of aromatic phosphate compounds, including metalated derivatives thereof, as flame retardant additives.

The present inventors have determined that phosphorus containing poly(arylene ether) copolymers that have reactive end caps can provide improved flame retardancy in addition to dielectric performance ("dual functional"). The phosphorous containing poly(arylene ether) copolymers can be improved alternatives to small molecule phosphorus flame retardant additives and metalated derivatives thereof. The dual-functional poly(arylene ether) copolymers are also amenable to crosslinking and can be used, for example, as crosslinker additives in compositions for varnishes, prepregs, laminates, or metal foil laminates for printed wiring boards. Moreover, the phosphorous functional groups can provide improved adhesion to metals. Hence, they can be also used as additives for adhesives or coatings.

The phosphorous containing poly(arylene ether) copolymer is a capped poly(arylene ether) copolymer of formula (1) or formula (2):

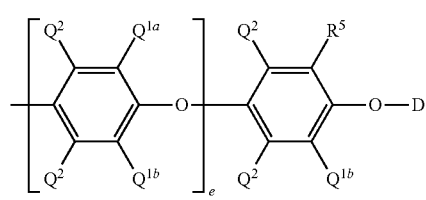

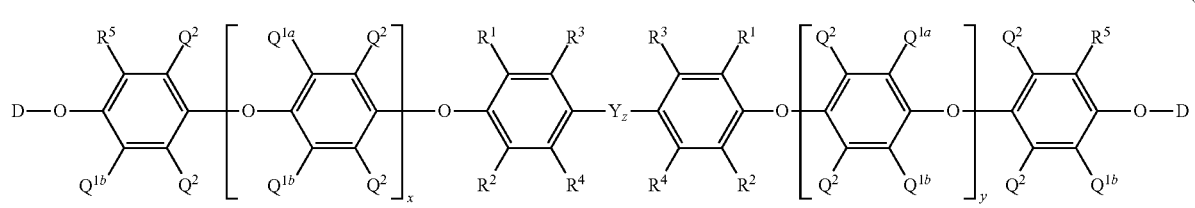

wherein, in formulas (1) and (2), $Q^{1a}$ is a $C_1$-$C_{12}$ primary or secondary alkyl; $Q^{1b}$ is halogen $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Q^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $R^1$, $R^2$, $R^3$, and $R^4$ is independently hydrogen, halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $R^5$ is independently $Q^{1a}$ or a ($C_1$-$C_6$-hydrocarbyl)($C_1$-$C_6$-hydrocarbyl)aminomethylene group; z is 0 or 1; and x and y represent the relative mole ratios of the arylene ether units wherein x and y are independently 0 to 50, ore is the number of moles of the arylene ether unit. For example, x and y can be independently 0 to 30.

In formulas (1) and (2), Y is a divalent linking group of the formula

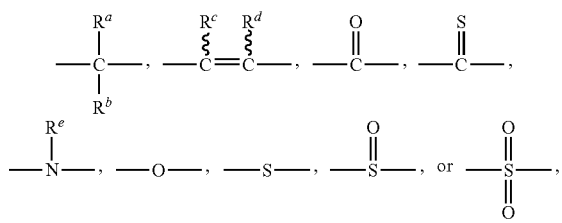

wherein each occurrence of $R^a$, $R^b$, $R^d$, and $R^e$ is independently hydrogen, $C_1$-$C_{12}$ hydrocarbyl, or $C_1$-$C_6$ hydrocarbylene, optionally wherein $R^a$ and $R^b$ or $R^c$ and $R^d$ together are a $C_4$-$C_8$ alkylene group.

In formulas (1) and (2), each occurrence of D is independently a group of the formula

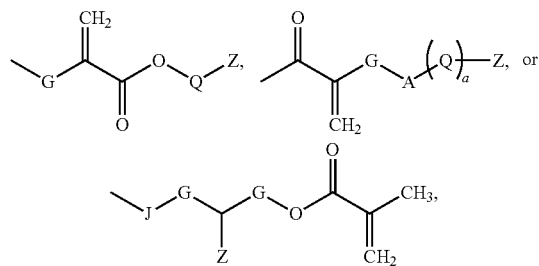

wherein each occurrence of G is independently $C_1$-$C_{12}$ hydrocarbylene; each occurrence of Q is independently $C_1$-$C_6$ alkylene or $C_6$-$C_{12}$ arylene, wherein a is 0 or 1; each occurrence of A is independently a single bond or —O—; each occurrence of J is independently a single bond, $C_1$-$C_6$ alkylene, or —(CH$_2$)$_n$NH(CH$_2$)$_n$(C=O)O— wherein n is 1 to 6. For example, each occurrence of Q is independently $C_1$-$C_3$ alkylene or $C_6$ phenylene; each occurrence of J is independently a single bond or —(CH$_2$)$_n$NH(CH$_2$)$_n$(C=O) O—; and n is 1 to 3. In still another example, D is a group of the formula

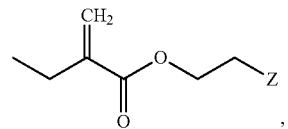

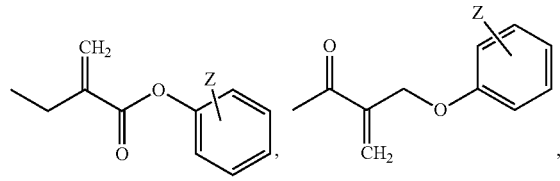

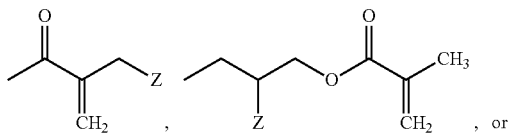

In formulas (1) and (2), each occurrence of Z is independently of formula (3)

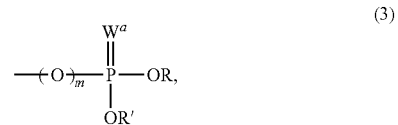

wherein $W^a$ is O or S; each of R and R' is independently hydrogen, $C_1$-$C_{12}$ hydrocarbyl, or $C_1$-$C_6$ hydrocarbylene, optionally wherein both R and R' together are a $C_2$-$C_8$ alkylene group; and m is 0 or 1. For example, $W^a$ is O; and R and R' are independently hydrogen or $C_1$-$C_6$ alkyl.

In formulas (1) or (2), $Q^{1a}$ can be $C_1$-$C_{12}$ primary alkyl; $Q^{1b}$ is $C_1$-$C_{12}$ alkyl; $Q^2$ is hydrogen; and $R^1$, $R^2$, $R^3$, and $R^4$ can each be independently hydrogen, halogen, or $C_1$-$C_{12}$ alkyl. For example, $Q^{1a}$ is $C_1$-$C_6$ primary alkyl; $Q^{1b}$ is $C_1$-$C_6$ alkyl; $Q^2$ is hydrogen; and $R^1$, $R^2$, $R^3$, and $R^4$ are each independently hydrogen or $C_1$-$C_6$ alkyl. In another example, $Q^{1a}$ and $Q^{1b}$ are methyl; $Q^2$ is hydrogen; and $R^1$, $R^2$, $R^3$, and $R^4$ are each independently hydrogen or $C_1$-$C_6$ alkyl.

In formulas (1) and (2), $R^5$ can be a ($C_1$-$C_6$-hydrocarbyl)($C_1$-$C_6$-hydrocarbyl)aminomethylene group. For example, $Q^{1a}$ is $C_1$-$C_6$ primary alkyl; $Q^{1b}$ is $C_1$-$C_6$ alkyl; $Q^2$ is hydrogen; $R^1$, $R^2$, $R^3$, and $R^4$ are each independently hydrogen or $C_1$-$C_6$ alkyl; and $R^5$ is a ($C_1$-$C_6$-alkyl)($C_1$-$C_6$-alkyl)aminomethylene group.

The capped poly(arylene ether) copolymer can be a capped poly(phenylene ether) copolymer of formula (4)

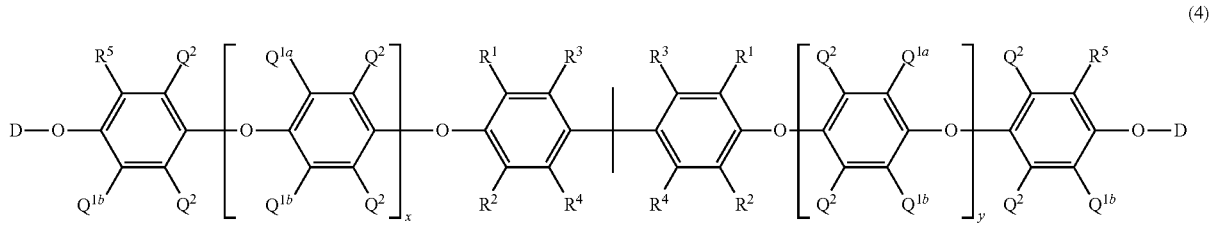

wherein $Q^{1a}$, $Q^{1b}$, $Q^2$, $R^1$, $R^2$, $R^3$, $R^4$, $R^5$, D, x, and y are as defined in formulas (1) and (2).

There is no particular limitation on the molecular weight or intrinsic viscosity of the capped poly(arylene ether) copolymer. For example, the capped poly(arylene ether) copolymer can have an absolute number average molecular weight ($M_n$) of 500 to 25,000 grams per mole (g/mol), preferably 500 to 10,000 g/mol, more preferably 500 to 5,000 g/mol, even more preferably 500 to about 2,900 g/mol, 800 to 2,200 g/mol, or 1,000 to 1,600 g/mol, as determined by Gel Permeation Chromatography (GPC). The capped poly(arylene ether) copolymer can have an intrinsic viscosity (I.V.) ranging from 0.04 to 0.5 deciliters per gram (dL/g), preferably 0.055 to 0.39 dL/g, as measured in chloroform at 25° C.

The capped poly(arylene ether) copolymer can be formed through a process including reacting a capping agent and an uncapped poly(arylene ether) copolymer comprising a phenolic (free hydroxyl) end group under conditions effective to provide a reaction mixture comprising the capped poly(arylene ether) copolymer. The capped poly(arylene ether) copolymer is defined herein as a poly(arylene ether) copolymer in which at least 50%, preferably at least 75%, more preferably at least 90%, yet more preferably at least 95%, even more preferably at least 99%, of the free hydroxyl groups present in the corresponding uncapped poly(arylene ether) copolymer have been functionalized by reaction with a capping agent.

The uncapped poly(arylene ether) copolymer includes a poly(arylene ether) copolymer comprising a phenolic end group that can be obtained by reacting a monohydric phenol, for example having a methyl group ortho to the phenol oxygen, and a dihydric phenol in the presence of molecular oxygen and a polymerization catalyst comprising a metal ion and at least one amine ligand. Methods for this process are described, for example, in U.S. Pat. No. 3,306,874 to Hay, U.S. Pat. No. 4,463,164 to Dalton et al., and U.S. Pat. No. 3,789,054 to Izawa et al. The uncapped poly(arylene ether) composition can include an uncapped poly(arylene ether) copolymer that is a product mixture of the reaction of a monohydric phenol, a dihydric phenol, a metal catalyst, and a ($C_1$-$C_{12}$-hydrocarbyl)($C_1$-$C_{12}$-hydrocarbyl)amine.

The monohydric phenol has one hydroxy group bound directly to an aromatic ring. Suitable monohydric phenols includes those phenol having the structure (5)

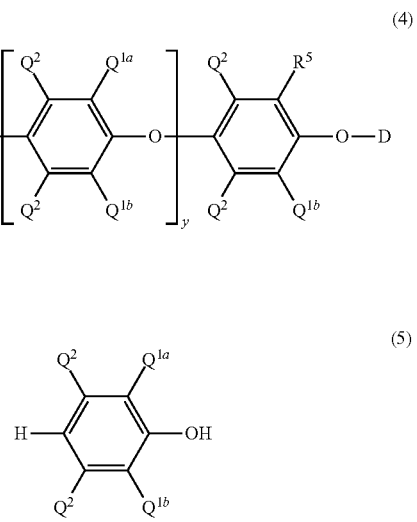

wherein $Q^{1a}$ is a $C_1$-$C_{12}$ primary or secondary alkyl; $Q^{1b}$ is halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Q^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. For example, $Q^{1a}$ is methyl, and $Q^{1b}$ is halogen, unsubstituted $C_1$-$C_{12}$ alkyl provided that the alkyl group is not tertiary alkyl, or unsubstituted $C_1$-$C_{12}$ aryl.

Exemplary monohydric phenols include 2,6-dimethylphenol, 2-methylphenol, 2,5-dimethylphenol, 2,3,6-trimethylphenol, 2-methyl-6-phenyl phenol, or a combination thereof. For example, the monohydric phenol comprises 2,6-dimethylphenol.

The dihydric phenol has two hydroxy groups bound directly to the same aromatic ring or to two different aromatic rings within the same molecule. Suitable dihydric phenols include those having the structure (6)

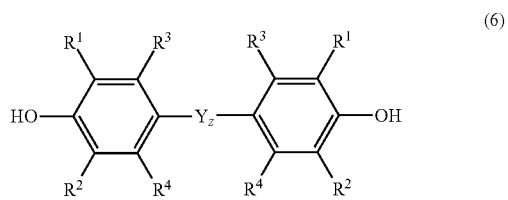

wherein each occurrence of IV, $R^2$, $R^3$, and $R^4$ is independently hydrogen, halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y is a divalent linking group of the formula

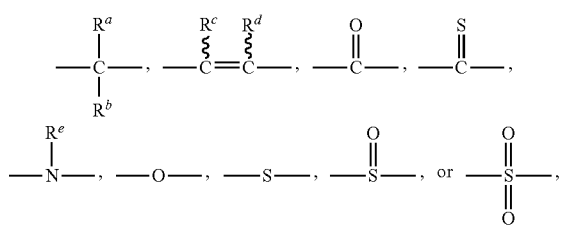

wherein each occurrence of $R^a$, $R^b$, $R^d$, and $R^e$ is independently hydrogen, $C_1$-$C_{12}$ hydrocarbyl, or $C_1$-$C_6$ hydrocarbylene, optionally wherein $R^d$ and $R^b$ or $R^c$ and $R^d$ together are a $C_4$-$C_8$ alkylene group. When z is 0, the two aryl groups are connected by a single bond. In some embodiments, z is 1. Examples of dihydric phenols include 3,3',5,5'-tetramethyl-4,4'-biphenol, 2,2-bis(3-methyl-4-hydroxyphenyl)propane, 2,2-bis(3,5-dimethy-4-hydroxyphenyl)propane, 1,1-bis(4-hydroxyphenyl)methane, 1,1-bis(4-hydroxyphenyl) ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)-n-butane, bis(4-hydroxyphenyl)phenylmethane, 2,2-bis(4-hydroxy-3-methylphenyl)propane, 1,1-bis(4-hydroxy-3,5-methylphenyl)cyclohexane, 1,1-bis(4-hydroxy-3,5-dimethylphenyl)cyclopentane, 1,1-bis(4-hydroxy-3,5-dimethylphenyl)cyclohexane, 1,1-bis(4-hydroxy-3-methylphenyl)cycloheptane, 1,1-bis(4-hydroxy-3,5-dimethylphenyl)cycloheptane, 1,1-bis(4-hydroxy-3-methylphenyl)cyclooctane, 1,1-bis(4-hydroxy-3,5-dimethylphenyl)cyclooctane, 1,1-bis(4-hydroxy-3-methylphenyl)cyclononane, 1,1-bis(4-hydroxy-3,5-dimethylphenyl)cyclononane, 1,1-bis(4-hydroxy-3-methylphenyl)cyclodecane, 1,1-bis(4-hydroxy-3,5-dimethylphenyl)cyclodecane, 1,1-bis(4-hydroxy-3-methylphenyl)cycloundecane, 1,1-bis(4-hydroxy-3,5-dimethylphenyl)cycloundecane, 1,1-bis(4-hydroxy-3-methylphenyl)cyclododecane, 1,1-bis(4-hydroxy-3,5-dimethylphenyl)cyclododecane, 1,1-bis(4-hydroxy-3-t-butylphenyl)propane, 2,2-bis(4-hydroxy-2,6-dimethylphenyl)propane, 2,2-bis(4-hydroxy-3-bromophenyl)propane, 1,1-bis(4-hydroxyphenyl) cyclopentane, 1,1-bis(4-hydroxyphenyl)cyclohexane, 2,2',6, 6'-tetramethyl-3,3',5,5'-tetrabromo-4,4'-biphenol, 2,2',5,5'-tetramethyl-4,4'-biphenol, or a combination thereof.

For example, the dihydric phenol comprises 2,2-bis(3,5-dimethyl-4-hydroxyphenol)propane.

The uncapped poly(arylene ether) copolymer is formed by polymerization of monomers comprising monohydric phenol and dihydric phenol by continuous addition of oxygen to a reaction mixture comprising the monomers, optionally a solvent, and the polymerization catalyst. The molecular oxygen ($O_2$) can be provided as air or pure oxygen. The polymerization catalyst is a metal complex, i.e. a metal catalyst, comprising a transition metal cation, including cations from Group VIB, VIIB, VIIIB, or IB of the periodic table, or a combination thereof. Of these, chromium, manganese, cobalt, copper, and combinations comprising at least one of the foregoing cations can be used. In some examples, the metal cation is copper ($Cu^+$ or $Cu^{2+}$). Metal salts which can serve as sources of metal cations include cuprous chloride, cupric chloride, cuprous bromide, cupric bromide, cuprous iodide, cupric iodide, cuprous sulfate, cupric sulfate, cuprous tetraamine sulfate, cupric tetraamine sulfate, cuprous acetate, cupric acetate, cuprous propionate, cupric butyrate, cupric laurate, cuprous palmitate, cuprous benzoate, and the corresponding manganese salts and cobalt salts. Instead of use of any of the above-exemplified metal salts, it is also possible to add a metal or a metal oxide and an inorganic acid, organic acid or an aqueous solution of such an acid and form the corresponding metal salt or hydrate in situ. For example, cuprous oxide and hydrobromic acid can be added to generate cuprous bromide in situ.

The polymerization catalyst further comprises an amine ligand. The amine ligand can be, for example, a monoamine, an alkylene diamine, or a combination thereof. Monoamines include dialkylmonoamines (such as di-n-butylamine, or DBA) and trialkylmonoamines (such as N,N-dimethylbutylamine, or DMBA). In an embodiment, the monoamine is a ($C_1$-$C_{12}$-hydrocarbyl)($C_1$-$C_{12}$-hydrocarbyl)monoamine wherein each hydrocarbyl group can be the same or different. Preferably, at least one of the $C_1$-$C_{12}$-hydrocarbyl groups is an alkyl group. For example, the ($C_1$-$C_6$-hydrocarbyl)($C_1$-$C_6$-hydrocarbyl)monoamine is a di($C_1$-$C_6$-hydrocarbyl)monoamine wherein each hydrocarbyl group is the same, and preferably is an alkyl group. In another example, the ($C_1$-$C_6$-hydrocarbyl)($C_1$-$C_6$-hydrocarbyl) monoamine is a di($C_1$-$C_6$-alkyl)monoamine wherein each alkyl group is the same, preferably a di($C_1$-$C_6$-alkyl)monoamine wherein each alkyl group is the same. Exemplary ($C_1$-$C_{12}$-hydrocarbyl)($C_1$-$C_{12}$-hydrocarbyl)monoamines include di-n-butylamine, or DBA), n-butylethylamine, di-tert-butylamine, tert-butylethylamine, dimethylamine, di-n-propylamine, di-sec-butyl amine, dipentylamine, dihexylamine, dioctylamine, didecylamine, dibenzylamine, methylethylamine, methylbutylamine, dicyclohexylamine, N-ethylaniline, N-butyl aniline, N-methyl-2-methylaniline, N-methyl-2,6-dimethylaniline, diphenylamine, or a combination thereof. Diamines include alkylenediamines, such as N,N'-di-tert-butylethylenediamine, DBEDA, or the like, and combinations thereof. Exemplary trialkylmonoamines include trimethylamine, triethylamine, tripropylamine, tributylamine, butyldimethylamine, phenyldiethylamine, or the like, and combinations thereof.

When the amine ligand comprises a secondary amine such as di-n-butylamine, some of the secondary amine is chemically incorporated into the uncapped poly(arylene ether) copolymer at the benzylic position of terminal monohydric phenol units. The covalently bound monoamine groups are present as aminomethyl groups ortho to the phenol oxygen in terminal units as indicated below:

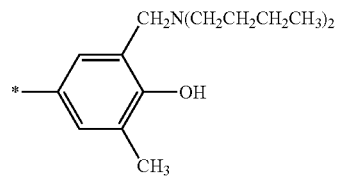

The amount of covalently bound monoamine groups can be determined by $^1$H-NMR spectroscopy. Covalently bound monoamine groups can adversely affect the oxidative stability of capped poly(arylene ether) copolymer, and can result in yellowing of the capped poly(arylene ether) copolymer upon heat aging.

The solvent can include, based on the total weight of the solvent, at least 95 weight percent (wt %) of a $C_1$-$C_3$ alcohol selected from the group consisting of methanol, ethanol, 1-propanol, and 2-propanol. Within this range, the solvent can comprise at least 98, 99, or 99.9 wt % of the $C_1$-$C_3$ alcohol. The solvent can comprise less than 5 wt %, specifically less than 2, 1, or 0.1 wt % of a solvent other than the $C_1$-$C_3$ alcohol. For example, the solvent other than the $C_1$-$C_3$ alcohol can comprise water introduced as a solution of the metal ion, for example $Cu_2O$, or toluene introduced as a solution of an amine ligand, for example di-tert-butylethylenediamine. For example, the $C_1$-$C_3$ alcohol is methanol, and the solvent comprises at least 99 wt % of methanol.

The uncapped poly(arylene ether) copolymer can be of formulas (1a) or (2a)

molecular weight of 300 to 10,000 g/mol, specifically 300 to 8,000 g/mol, 300 to 5,000 g/mol, or 300 to 3,000 g/mol, as determined by GPC.

The capped poly(arylene ether) copolymer is formed by the reaction of an uncapped poly(arylene ether) copolymer comprising a phenolic end group under conditions effective to provide a reaction mixture comprising the capped poly (arylene ether) copolymer. Exemplary capping agent include compounds of the formulas

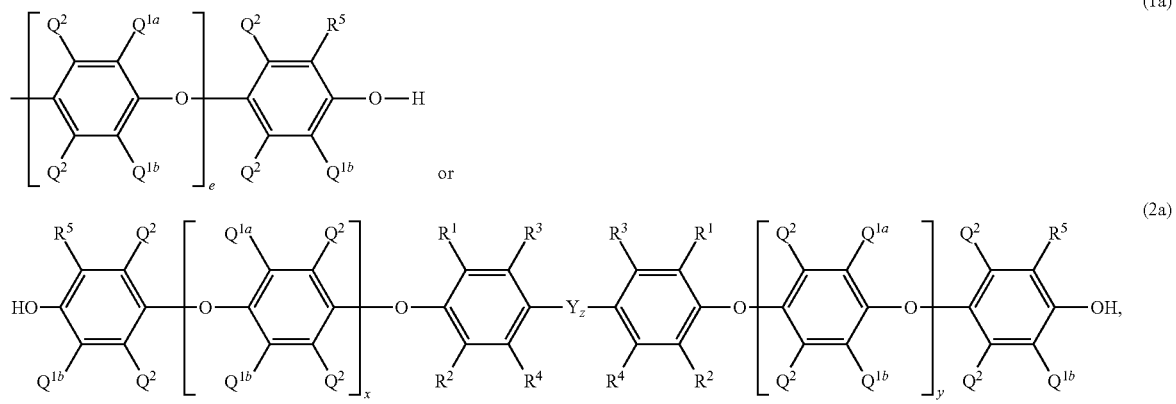

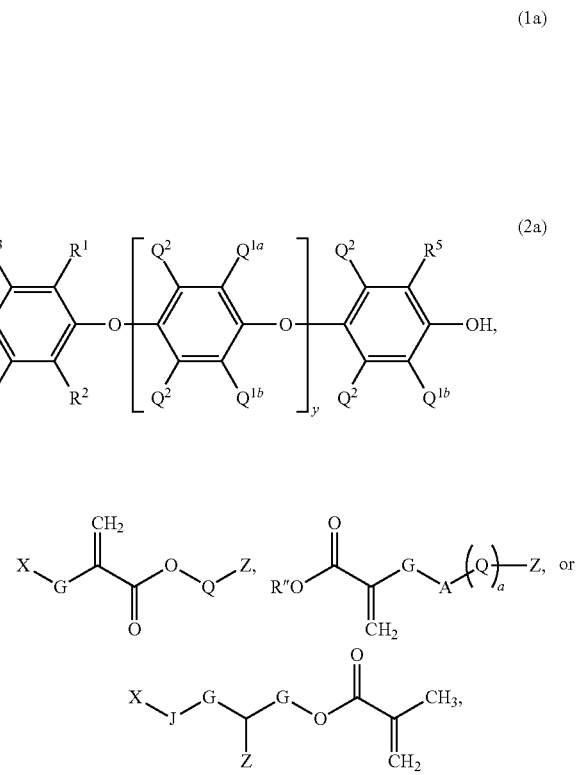

wherein, in formulas (1a) and (2a), $Q^{1a}$, $Q^{1b}$, $Q^2$, $R^1$, $R^2$, $R^3$, $R^4$, $R^5$, Y, e, x, y, and z are as described in formulas (1) and (2). Further in formulas (1a) and (2a), each occurrence of $R^5$ is independently $Q^{1a}$ or a ($C_1$-$C_6$-hydrocarbyl)($C_1$-$C_6$-hydrocarbyl)aminomethylene group, with the proviso that at least 50 parts per million (ppm) by weight of the $R^5$ groups are ($C_1$-$C_6$-hydrocarbyl)($C_1$-$C_6$-hydrocarbyl)aminomethylene groups, based on the total parts by weight of the copolymer (ppm). In some aspects, 50 to 500 parts per million by weight (ppm), preferably 50 to 1,000 ppm, more preferably 50 to 3,000 ppm of the $R^5$ groups are ($C_1$-$C_6$-hydrocarbyl)($C_1$-$C_6$-hydrocarbyl)aminomethylene groups. For example, the ($C_1$-$C_6$-hydrocarbyl)($C_1$-$C_6$-hydrocarbyl) aminomethylene groups is a di($C_1$-$C_6$-alkyl)aminomethylene group, preferably di-n-butylaminomethylene or 2-((tert-butyl(2-(tert-butylamino)ethyl)amino)methylene).

In formulas (1a) and (2a), x and y represent the relative mole ratios of the arylene ether units. For example, x and y are each independently zero to 50, provided that the sum of x and y is 4 to 53. For example, the sum of x and y is 8 to 20, preferably 8 to 15, more preferably 8 to 10.

The uncapped poly(arylene ether) copolymer can comprise 80 to 99 wt % of repeat units derived from the monohydric phenol and 1 to 20 wt % of repeat units derived from the dihydric phenol. Within this range, the uncapped poly(arylene ether) copolymer can comprise 85 to 95 wt % of repeat units derived from the monohydric phenol and 5 to 15 wt % of repeat units derived from the dihydric phenol.

The absolute number average molecular weight of the uncapped poly(arylene ether) copolymer is 300 to 25,000 grams per mole (g/mol), as determined by Gel Permeation Chromatography (GPC). For example, the uncapped poly (arylene ether) copolymer has an absolute number average wherein each occurrence of G is independently $C_1$-$C_{12}$ hydrocarbylene; each occurrence of Q is independently $C_1$-$C_6$ alkylene or $C_6$-$C_{12}$ arylene, wherein a is 0 or 1; each occurrence of A is independently a single bond or —O—; each occurrence of J is independently a single bond, $C_1$-$C_6$ alkylene, or —($CH_2$)$_n$NH($CH_2$)$_n$(C=O)O— wherein n is 1 to 6; X is a halogen, a tosylate, a mesylate, or a triflate; R" is $C_1$-$C_6$ alkyl; and each occurrence of Z is independently of the formula

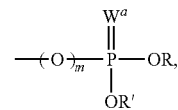

wherein $W^a$ is O or S; each occurrence of R and R' is independently hydrogen, $C_1$-$C_{12}$ hydrocarbyl, or $C_1$-$C_6$ hydrocarbylene, optionally wherein both R and R' together are a $C_2$-$C_8$ alkylene group; and m is 0 or 1.

Methods of reacting an uncapped poly(arylene ether) with a capping agent are described, for example, in U.S. Pat. No. 3,375,228 to Holoch et al.; U.S. Pat. No. 4,148,843 to Goossens, U.S. Pat. No. 4,806,602 to White et al.; U.S. Pat. No. 5,219,951 to Nelissen et al.; U.S. Pat. No. 6,384,176 to Braat et al; U.S. Patent Application Publication No. 2001/0053820 A1 to Yeager et al.; and European Patent No. 261,574 B1 to Peters et al.

A capping catalyst may be employed in the reaction of an uncapped poly(arylene ether) with a capping agent. Examples of such compounds, including those known to the art, that are capable of catalyzing condensation of phenols with the capping agents described above. For example, the capping catalyst can be a hydroxide salt such as sodium hydroxide, potassium hydroxide, tetraalkylammonium hydroxides, or the like; tertiary alkylamines such as tributyl amine, triethylamine, dimethylbenzylamine, dimethylbutylamine, or the like; tertiary mixed alkyl-arylamines and substituted derivatives thereof such as N,N-dimethylaniline; heterocyclic amines such as imidazoles, pyridines, and substituted derivatives thereof such as 2-methylimidazole, 2-vinylimidazole, 4-(dimethylamino)pyridine, 4-(1-pyrrolino) pyridine, 4-(1-piperidino)pyridine, 2-vinylpyridine, 3-vinylpyridine, 4-vinylpyridine, or the like.

The capping catalyst can be an organic amine catalyst. Preferred organic amine catalysts include, for example, tertiary alkylamines, tertiary mixed alkyl-aryl amines, heterocyclic amines, and the like. It will be understood that the organic amine catalyst includes ammonium ions formed by protonation of the organic amine. In one embodiment, the capping catalyst comprises a 4-dialkylaminopyridine having the structure

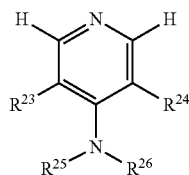

wherein $R^{23}$ and $R^{24}$ are each independently hydrogen or $C_1$-$C_6$ alkyl, and $R^{25}$ and $R^{26}$ are each independently $C_1$-$C_6$ alkyl. For example, the capping catalyst comprises 4-dimethylaminopyridine (DMAP).

Alternatively, the capping catalyst can be a transesterification catalyst that is capable of catalyzing transesterification of phenols with the capping agents described above may be used. For example, the capping catalyst can be alpha catalysts that comprise a source of alkali or alkaline earth ions. The sources of these ions include alkali metal hydroxides such as lithium hydroxide, sodium hydroxide, and potassium hydroxide, as well as alkaline earth hydroxides such as magnesium hydroxide and calcium hydroxide. Other possible sources of alkali and alkaline earth metal ions include the corresponding salts of carboxylic acids (such as sodium acetate) and derivatives of ethylene diamine tetraacetic acid (EDTA) (such as EDTA tetrasodium salt, and EDTA magnesium disodium salt). Other alpha transesterification catalysts include alkali or alkaline earth metal salts of carbonate, such as $Cs_2CO_3$, $NaHCO_3$, and $Na_2CO_3$, or the like, non-volatile inorganic acid such as $NaH_2PO_3$, $NaH_2PO_4$, $Na_2HPO_3$, $KH_2PO_4$, $CsH_2PO_4$, $Cs_2HPO_4$, or the like, or mixed salts of phosphoric acid, such as $NaKHPO_4$, $CsNaHPO_4$, $CsKHPO_4$, or the like. Combinations of the foregoing catalysts can be used.

The capping catalyst may alternatively be a beta transesterification catalyst that comprises a quaternary ammonium compound, a quaternary phosphonium compound, or a combination thereof. The quaternary ammonium compound can be a compound of the structure $(R^{14})_4N^+X^-$, wherein each $R^{14}$ is the same or different, and is a $C_1$-$C_{20}$ alkyl, a $C_4$-$C_{20}$ cycloalkyl, or a $C_4$-$C_{20}$ aryl; and $X^-$ is an organic or inorganic anion, for example a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations thereof. For example, tetramethyl ammonium hydroxide can be used. The quaternary phosphonium compound can be a compound of the structure $(R^{15})_4P^+X^-$, wherein each $R^{15}$ is the same or different, and is a $C_1$-$C_{20}$ alkyl, a $C_4$-$C_{20}$ cycloalkyl, or a $C_4$-$C_{20}$ aryl; and $X^-$ is an organic or inorganic anion, for example a hydroxide, phenoxide, halide, carboxylate such as acetate or formate, sulfonate, sulfate, formate, carbonate, or bicarbonate. Where $X^-$ is a polyvalent anion such as carbonate or sulfate it is understood that the positive and negative charges in the quaternary ammonium and phosphonium structures are properly balanced. For example, where $R^{14}$ or $R^{15}$ are each methyl and $X^-$ is carbonate, it is understood that $X^-$ represents $\frac{1}{2}(CO_3^{-2})$. Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations thereof. For example, TBPA can be used.

The capping reactions can be performed in a suitable solvent, for example aromatic hydrocarbons such as toluene or xylene, or chlorinated aromatic hydrocarbons such as chlorobenzene, o-dichlorobenzene, or 1,2,4-trichlorobenzene. For example, the solvent comprises toluene.

The process can further include isolating the capped poly(arylene ether) copolymer from the reaction mixture. Suitable methods include precipitation and total isolation methods. A total isolation process can be used for isolating the capped poly(arylene ether) copolymer when the intrinsic viscosity (I.V.) is less than about 0.25 deciliters per gram (dL/g), as measured in chloroform at 25° C. As part of the total isolation, a portion of the solvent is preferably removed in order to reduce the solvent load on the total isolation equipment. Concentration of the copolymer containing solution is preferably accomplished by reducing the pressure in a solvent flash vessel while preferably increasing the temperature of the copolymer containing solution. The isolated copolymer can further be dried at elevated temperatures, for example at 80° C. to 160° C., preferably at 100° C. to 140° C. for 6 to 24 hours, preferably 8 to 16 hours.

The capped poly(arylene ether) copolymer can also be a part of a composition that may comprise a blend of at least two capped poly(arylene ether) copolymers. Such blends may be prepared from individually prepared and isolated capped poly(arylene ether) copolymers. Alternatively, such blends may be prepared by reacting a single uncapped poly(arylene ether) copolymer with at least two capping agents.

The capped poly(arylene ether) copolymer may be suited as a reactive component in a curable composition comprising a thermosetting resin. Thus a curable composition comprises a thermosetting resin and the capped poly(arylene ether) copolymer described herein. The thermosetting resin can be, for example, an epoxy resin, a cyanate ester resin, a bismaleimide resin, a polybenzoxazine resin, a vinyl resin, a phenolic resin, an alkyd resin, an unsaturated polyester resin, or a combination thereof. Epoxy resins useful as thermosetting resins can be produced by reaction of phenols or polyphenols with epichlorohydrin to form polyglycidyl ethers. Examples of phenols for production of epoxy resins include substituted bisphenol A, bisphenol F, hydroquinone, resorcinol, tris-(4-hydroxyphenyl)methane, and novolac resins derived from phenol or o-cresol. Epoxy resins can also be produced by reaction of aromatic amines, such as p-aminophenol or methylenedianiline, with epichlorohydrin to form polyglycidyl amines.

Epoxy resins can be converted into solid, infusible, and insoluble three dimensional networks by curing with cross-linkers, often called curing agents, or hardeners. Curing agents are either catalytic or coreactive. Coreactive curing agents have active hydrogen atoms that can react with epoxy groups of the epoxy resin to form a cross-linked resin. The active hydrogen atoms can be present in functional groups comprising primary or secondary amines, phenols, thiols, carboxylic acids, or carboxylic acid anhydrides. Examples of coreactive curing agents for epoxy resins include aliphatic and cycloaliphatic amines and amine-functional adducts with epoxy resins, Mannich bases, aromatic amines, polyamides, amidoamines, phenalkamines, dicyandiamide, polycarboxylic acid-functional polyesters, carboxylic acid anhydrides, amine-formaldehyde resins, phenol-formaldehyde resins, polysulfides, polymercaptans, and combinations thereof. A catalytic curing agent functions as an initiator for epoxy resin homopolymerization or as an accelerator for coreactive curing agents. Examples of catalytic curing agents include tertiary amines, such as 2-ethyl-4-methylimidazole, Lewis acids, such as boron trifluoride, and latent cationic cure catalysts, such as diaryliodonium salts.

The thermosetting resin can be a cyanate ester. Cyanate esters are compounds having a cyanate group (—O—C≡N) bonded to carbon via the oxygen atom, i.e. compounds with C—O—C≡N groups. Cyanate esters useful as thermosetting resins can be produced by reaction of a cyanogen halide with a phenol or substituted phenol. Examples of phenols include bisphenols utilized in the production of epoxy resins, such as bisphenol A, bisphenol F, and novolac resins based on phenol or o-cresol. Cyanate ester prepolymers are prepared by polymerization/cyclotrimerization of cyanate esters. Prepolymers prepared from cyanate esters and diamines can also be used. The thermosetting resin can be a bismaleimide. Bismaleimide resins can be produced by reaction of a monomeric bismaleimide with a nucleophile such as a diamine, aminophenol, or amino benzhydrazide, or by reaction of a bismaleimide with diallyl bisphenol A.

The thermoset resin can be a vinyl resin. A vinyl resin is a monomer or polymer having units of unsaturation, or having double bond (C=C). Examples of vinyl resins include unsaturated polyesters, allyl ethers, vinyl ethers, styrene, divinylbenzenes, (meth)acrylates, tri(alkenyl) isocyanurates, polybutadienes, and combinations comprising at least one of the foregoing. Curing agents may contain two or more unsaturated groups, and may include polyfunctional (meth)acrylates, polyfunctional vinyls, or the like.

The curable composition can further include a reaction initiator or curing catalyst. Exemplary reaction initiators include, but are not limited to, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethyl-hexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl)bis(t-butylperoxy-m-isopropyl)benzene, 2,5-dimethyl-2,5-di(t-butylperoxy)hexane, di(t-butylperoxy) isophthalate, t-butylperoxy benzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, t-butylperoxy isopropyl carbonate, 3,3',5,5'-tetramethyl-1,4-diphenoquinone, chloranil, 2,4,6-tri-t-butyl phenol, or a combination thereof. In other examples, a reaction initiator is not used.

The curable compositions can contain the reaction initiator in quantities effective for curing the composition. The effective amount can be 0.5 to 10 wt %, preferably 1 to 5 wt %, based on the total weight of the curable composition.

Preferably, the curable composition comprises 5 to 95 wt % of the capped poly(arylene ether) copolymer and 5 to 95 wt % of a thermosetting resin, based on the total weight of the curable composition.

The curable composition may further contain flame retardant synergists such as antimony pentoxide; antioxidants, thermal and ultraviolet stabilizers, lubricants, anti-static agents, dyes, pigments, curing agents, reinforcing materials and other constituents, or the like. The thermosetting components, such as those described above, may be used either alone or in combination with one another or with another thermoplastic resin.

A cured composition can be obtained by heating the curable composition defined herein for a time and temperature sufficient to effect curing. For example, the temperature for thermal cure can be from 10° C. to 325° C. and the curing time can be 1 minute to 6 hours. In curing, a cross-linked, three-dimensional polymer network is formed. For certain thermosetting resins, for example (meth)acrylate resins, curing can also take place by irradiation with actinic radiation at a sufficient wavelength and time. For example, the curing of a curable composition containing a UV photoinitiator may be carried out under a predetermined amount of UV light source for a period of time sufficient to cure the composition, and the curing conditions may be dependent on the photoinitiator used in the curable composition.

Due to the presence of the capped poly(arylene ether) copolymer, the cured composition can have any of several beneficial physical properties that are useful in various articles, including good impact strength, hydrolytic stability, low moisture absorption, high $T_g$, superior flame retardancy, and good dielectric properties. Thus, an article can comprise the cured composition obtained, for example, by heating the curable composition defined herein for a time and temperature sufficient to effect curing.

The curable article can comprise a fibrous substrate (woven or non-woven) such as glass, quartz, polyester, polyimide, polypropylene, cellulose, carbon fibers and carbon fibrils, nylon or acrylic fibers, preferably a glass substrate, that is impregnated with the curable composition (i.e., prepregs). For the formation of prepregs, the curable composition can be dissolved in an effective amount of an organic solvent, for example toluene, applied to the substrate, and then the organic solvent can be removed by evaporation or the like.

The curable composition can also be used in applications including electronic applications such as capillary underfill formulations and electrically conductive adhesive formulations. The curable composition can also be used as clean resin or clean reactive diluent for electronic applications or as a reactive diluent for composite applications, electrically conductive adhesive (ECA) formulations, and for UV cure applications (i.e. coatings), UV cure formulations for inks and coatings, and laminate applications such as copper clad laminates. For example, the curable composition can be used in solder masks, coatings for photolithography, conductive inks, and adhesives.

The phosphorous containing capped poly(arylene ether) copolymer can be present in the cured composition in at least the minimum amount necessary to impart a degree of flame retardancy to the composition to pass the desired UL-94 protocol. The particular amount will vary, depending on the molecular weight of the capped poly(arylene ether) copolymer, the amount of the flammable resin present and possibly other normally flammable ingredients which might also be included in the composition.

Example

An exemplary capped poly(arylene ether) copolymer can be prepared as follows. A monohydric phenol (e.g., 2,6-dimethylphenol) can be reacted with a dihydric phenol (e.g., 2,2-bis(3,5-dimethyl-4-hydroxyphenol)propane) in the presence of air and a polymerization catalyst (e.g., cuprous bromide and di-n-butylamine) to obtain the uncapped poly (arylene ether) copolymer having phenolic end groups. The uncapped poly(arylene ether) copolymer can be subsequently reacted with a phosphorous-containing capping agent in toluene and in the presence of a capping catalyst (e.g., 4-dimethylaminopyridine). The resulting capped poly (arylene ether) copolymer can be isolated from the reaction mixture using a total isolation method.

This disclosure further encompasses the following aspects.

Aspect 1. A capped poly(arylene ether) copolymer having formula (1) or formula (2), wherein $Q^{1a}$ is a $C_1$-$C_{12}$ primary or secondary alkyl; $Q^{1b}$ is halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Q^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $R^1$, $R^2$, $R^3$, and $R^4$ is independently hydrogen, halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $R^5$ is independently $Q^{1a}$ or a ($C_1$-$C_6$-hydrocarbyl)($C_1$-$C_6$-hydrocarbyl)aminomethylene group; z is 0 or 1; x and y represent the relative mole ratios of the arylene ether units wherein x and y are independently 0 to 50, or e is the number of moles of the arylene ether unit; Y is a divalent linking group of the formula

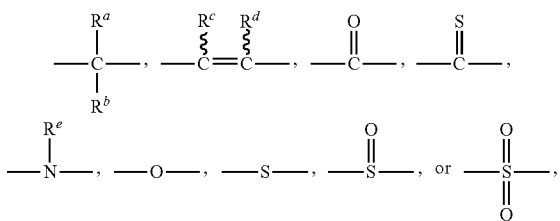

wherein each occurrence of $R^a$, $R^b$, $R^c$, $R^d$, and $R^e$ is independently hydrogen, $C_1$-$C_{12}$ hydrocarbyl, or $C_1$-$C_6$ hydrocarbylene, optionally wherein $R^a$ and $R^b$ or $R^c$ and $R^d$ together are a $C_4$-$C_8$ alkylene group; and each occurrence of D is independently a group of the formula

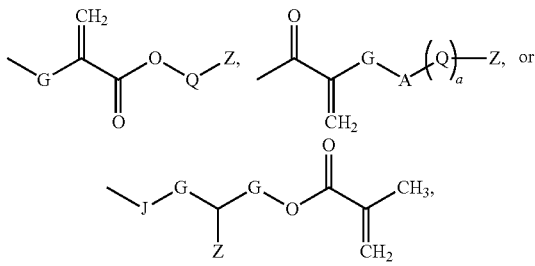

wherein each occurrence of G is independently $C_1$-$C_{12}$ hydrocarbylene; each occurrence of Q is independently $C_1$-$C_6$ alkylene or $C_6$-$C_{12}$ arylene, wherein a is 0 or 1; each occurrence of A is independently a single bond or —O—; each occurrence of J is independently a single bond, $C_1$-$C_6$ alkylene, or —$(CH_2)_n NH(CH_2)_n (C=O)O$— wherein n is 1 to 6; and each occurrence of Z is independently of the formula (3), wherein $W^a$ is O or S; each of R and R' is independently hydrogen, $C_1$-$C_{12}$ hydrocarbyl, or $C_1$-$C_6$ hydrocarbylene, optionally wherein both R and R' together are a $C_2$-$C_8$ alkylene group; and m is 0 or 1.

Aspect 2. The capped poly(arylene ether) copolymer of aspect 1, wherein $Q^{1a}$ is $C_1$-$C_{12}$ primary alkyl; $Q^2$ is hydrogen; and $R^1$, $R^2$, $R^3$, and $R^4$ are each independently hydrogen, halogen, or $C_1$-$C_{12}$ alkyl.

Aspect 3. The capped poly(arylene ether) copolymer of aspect 1 or aspect 2, wherein $Q^{1a}$ is $C_1$-$C_6$ primary alkyl; $Q^{1b}$ is $C_1$-$C_6$ alkyl; $Q^2$ is hydrogen; and $R^1$, $R^2$, $R^3$, and $R^4$ are each independently hydrogen or $C_1$-$C_6$ alkyl.

Aspect 4. The capped poly(arylene ether) copolymer of any one or more of aspects 1 to 3, wherein $Q^{1a}$ and $Q^{1b}$ are methyl; $Q^2$ is hydrogen; and $R^1$, $R^2$, $R^3$, and $R^4$ are each independently hydrogen or $C_1$-$C_6$ alkyl.

Aspect 5. The capped poly(arylene ether) copolymer of any one or more of aspects 1 to 4, wherein $R^5$ is a ($C_1$-$C_6$-hydrocarbyl)($C_1$-$C_6$-hydrocarbyl)aminomethylene group.

Aspect 6. The capped poly(arylene ether) copolymer of any one or more of aspects 1 to 5, wherein $Q^{1a}$ is $C_1$-$C_6$ primary alkyl; $Q^{1b}$ is $C_1$-$C_6$ alkyl; $Q^2$ is hydrogen; $R^1$, $R^2$, $R^3$, and $R^4$ are each independently hydrogen or $C_1$-$C_6$ alkyl; and $R^5$ is a ($C_1$-$C_6$-alkyl)($C_1$-$C_6$-alkyl)aminomethylene group.

Aspect 7. The capped poly(arylene ether) copolymer of any one or more of aspects 1 to 6, wherein the capped poly(arylene ether) copolymer is of formula (4).

Aspect 8. The capped poly(arylene ether) copolymer of any one or more of aspects 1 to 7, wherein each occurrence of Q is independently $C_1$-$C_3$ alkylene or $C_6$ phenylene; each occurrence of J is independently a single bond or —$(CH_2)_n NH(CH_2)_n (C=O)O$—; and n is 1 to 3.

Aspect 9. The capped poly(arylene ether) copolymer of any one or more of aspects 1 to 8, wherein D is a group of the formula

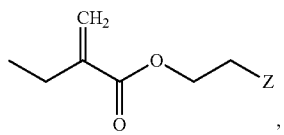

-continued

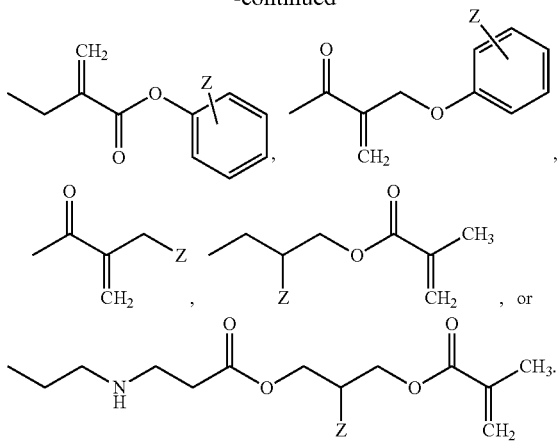

Aspect 10. The capped poly(arylene ether) copolymer of any one or more of aspects 1 to 9, wherein $W^a$ is O; and R and R' are independently hydrogen or $C_1$-$C_6$ alkyl.

Aspect 11. A process for forming the capped poly(arylene ether) copolymer of any one or more of aspects 1 to 10, the process comprising: reacting a capping agent and an uncapped poly(arylene ether) copolymer comprising a phenolic end group under conditions effective to provide a reaction mixture comprising the capped poly(arylene ether) copolymer.

Aspect 12. The process of aspect 11, wherein the capping agent comprises a compound of the formula

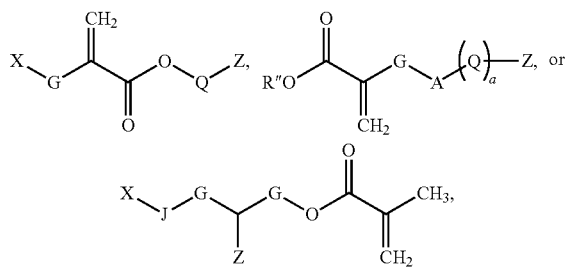

wherein each occurrence of G is independently $C_1$-$C_{12}$ hydrocarbylene; each occurrence of Q is independently $C_1$-$C_6$ alkylene or $C_6$-$C_{12}$ arylene, wherein a is 0 or 1; each occurrence of A is independently a single bond or —O—; each occurrence of J is independently a single bond, $C_1$-$C_6$ alkylene, or —$(CH_2)_n$NH$(CH_2)_n$(C=O)O— wherein n is 1 to 6; X is a halogen, a tosylate, a mesylate, or a triflate; R" is $C_1$-$C_6$ alkyl; and each occurrence of Z is independently

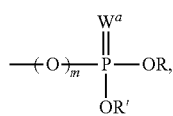

wherein $W^a$ is O or S; each of R and R' is independently hydrogen, $C_1$-$C_{12}$ hydrocarbyl, or $C_1$-$C_6$ hydrocarbylene, optionally wherein both R and R' together are a $C_2$-$C_8$ alkylene group; and m is 0 or 1.

Aspect 12a. The process of aspect 12, wherein X is a halogen; each occurrence of G is independently $C_1$-3 hydrocarbylene; each occurrence of Q is independently $C_1$-$C_3$ alkylene or phenylene; J is a single bond, $C_1$-$C_3$ alkylene, or —$(CH_2)_n$NH$(CH_2)_n$(C=O)O— wherein n is 1 to 3; $W^a$ is O; each of R and R' is independently hydrogen or $C_1$-$C_6$ hydrocarbyl; and m is 0 or 1.

Aspect 12b. The process of aspect 12 or aspect 12a, wherein X is Cl; J is $C_1$-$C_3$ alkylene or —$(CH_2)_n$NH$(CH_2)_n$(C=O)O— wherein n is 1 or 2; R and R' are hydrogen; and m is 1.

Aspect 13. The process of aspect 11 or aspect 12, wherein the uncapped poly(arylene ether) copolymer is of formula (1) or formula (2), wherein $Q^{1a}$ is a $C_1$-$C_{12}$ primary or secondary alkyl; $Q^{1b}$ is halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $Q^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $R^1$, $R^2$, $R^3$, and $R^4$ is independently hydrogen, halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; each occurrence of $R^5$ is independently $Q^{1a}$ or a $(C_1$-$C_6$-hydrocarbyl$)(C_1$-$C_6$-hydrocarbyl)aminomethylene group; z is 0 or 1; x and y represent the relative mole ratios of the arylene ether units wherein x and y are independently 0 to 50, or e is the number of moles of the arylene ether unit; Y is a divalent linking group of the formula

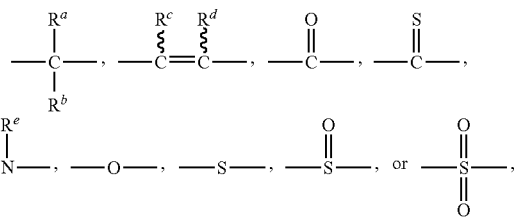

wherein each occurrence of $R^a$, $R^b$, $R^c$, $R^d$, and $R^e$ is independently hydrogen, $C_1$-$C_{12}$ hydrocarbyl, or $C_1$-$C_6$ hydrocarbylene, optionally wherein $R^a$ and $R^b$ or $R^c$ and $R^d$ together are a $C_4$-$C_8$ alkylene group.

Aspect 13a. The process of aspect 13, wherein $Q^{1a}$ is $C_1$-$C_{12}$ primary alkyl; $Q^2$ is hydrogen; and $R^1$, $R^2$, $R^3$, and $R^4$ are each independently hydrogen, halogen, or $C_1$-$C_{12}$ alkyl.

Aspect 13b. The process of any one or more of the proceeding claims, wherein the reacting is in the presence of a capping catalyst.

Aspect 13c. The process of any one or more of the proceeding claims, further comprising reacting a monohydric phenol and a dihydric phenol under conditions effective to provide the uncapped poly(arylene ether) copolymer.

Aspect 14. A curable composition comprising a thermosetting resin and the capped poly(arylene ether) copolymer of any one or more of aspects 1 to 12 or made by the method of any of aspects 11 to 13.

Aspect 15. A cured composition obtained by heating the curable composition of aspect 14 for a time and temperature sufficient to effect curing.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The singular forms "a" "an," and "the" include plural referents unless the context clearly dictates otherwise. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. "Combination thereof" is open, and includes combinations to the named items, as well as like items not named.

The endpoints of all ranges directed to the same component or property are inclusive of the endpoint and independently combinable. Disclosure of a narrower range or more specific group in addition to a broader range is not a disclaimer of the broader range or larger group.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Also as used herein, the term "combination" is inclusive of blends, mixtures, alloys, reaction products, and the like.

As used herein, the terms "hydrocarbyl" and "hydrocarbon" refer broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

The term "amino" refers to a radical of the formula —NRR' wherein R and R' are independently hydrogen or a $C_1$-$C_{30}$ hydrocarbyl, for example a $C_1$-$C_{20}$ alkyl group or a $C_6$-$C_{30}$ aryl group. The term "aminomethylene" refers to a radical of the formula —CH$_2$—NRR', wherein R and R' are each independently a $C_1$-$C_6$-hydrocarbyl.

The term "carboxylic acid" refers to a radical of the formula —COOH, wherein the carbon atom is covalently bonded to another carbon atom. The term "thiocarboxylic acid" refers to a radical of the formula —C=S(OH) or —C=O(SH). The term "formyl" refers to a radical that is an aldehyde of the formula —C=O(H). The term imidate refers to a radical of the formula —C=NR(R'), wherein R and R' are each independently a $C_1$-$C_{12}$ hydrocarbyl. The term "nitrile" refers to a radical of the formula —CN. The term "hydrocarbylthio" refer to a radical of the formula —SR, wherein R is a $C_1$-$C_{12}$ hydrocarbyl.

"Halogen" or "halogen atom" as used herein may mean a fluorine, chlorine, bromine, or iodine atom. The prefix "halo" means a group or compound including one more halogens.

The prefix "hetero" means that the compound or group includes at least one member that is a heteroatom (e.g., 1, 2, or 3 heteroatom(s)), wherein the heteroatom(s) is each independently N, O, S, Si, or P. The suffix "oxy" indicates that the open valence of the group is on an oxygen atom and the suffix "thio" indicates that the open valence of the group is on a sulfur atom.

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, nitro; cyano (i.e., nitrile); azido; hydroxyl; halogen; alkanoyl (such as a $C_2$-$C_6$ alkanoyl group such as acyl); carboxamido; $C_1$-$C_6$ alkylthio; $C_1$-$C_6$ or $C_1$-$C_3$ alkyl; cycloalkyl; alkenyl; and alkynyl (including groups having at least one unsaturated linkages and from 2 to 8, or 2 to 6 carbon atoms); $C_1$-$C_6$ or $C_1$-$C_3$ haloalkyl; $C_1$-$C_6$ or $C_1$-$C_3$ alkoxy; $C_1$-$C_6$ or $C_1$-$C_3$ haloalkoxy; $C_1$-$C_6$ or $C_1$-$C_3$ alkylsulfonyl; $C_1$-$C_6$ or $C_1$-$C_3$ alkylsulfinyl; aminodi($C_1$-$C_6$ or $C_1$-$C_3$)alkyl; $C_6$-$C_{12}$ aryl having at least one aromatic ring (e.g., phenyl, biphenyl, naphthyl, or the like, each ring either substituted or unsubstituted aromatic); $C_6$-$C_{10}$ aryloxy; $C_7$-$C_{19}$ arylalkyl having 1 to 3 separate or fused rings and from 6 to 18 ring carbon atoms; $C_7$-$C_{12}$ alkylaryl (e.g., toluyl); or arylalkoxy having 1 to 3 separate or fused rings and from 6 to 18 ring carbon atoms, with benzyloxy being an exemplary arylalkoxy.

"(Meth)acryl" as used herein is a generic term for an acryl (which includes both acrylics and acrylates) and a methacryl (which includes both (meth)acrylics and (meth)acrylates). Thus, a compound having the prefix (meth), such as (meth) acrylic acid, may refer to compounds having the prefix "meth" and compounds not having the prefix "meth."

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A capped poly(arylene ether) copolymer having the formula:

[chemical structures]

wherein
$Q^{1a}$ is a $C_1$-$C_{12}$ primary or secondary alkyl;
$Q^{1b}$ is halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms;
each occurrence of $Q^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms;
each occurrence of $R^1$, $R^2$, $R^3$, and $R^4$ is independently hydrogen, halogen, $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms;
each occurrence of $R^5$ is independently $Q^{1a}$ or a ($C_1$-$C_6$-hydrocarbyl)($C_1$-$C_6$-hydrocarbyl)aminomethylene group;
z is 0 or 1;
x and y represent the relative mole ratios of the arylene ether units wherein x and y are independently 0 to 50, or e is the number of moles of the arylene ether unit;

Y is a divalent linking group of the formula

[chemical structures]

wherein each occurrence of $R^a$, $R^b$, $R^c$, $R^d$, and $R^e$ is independently hydrogen, $C_1$-$C_{12}$ hydrocarbyl, or $C_1$-$C_6$ hydrocarbylene, optionally wherein $R^a$ and $R^b$ or $R^c$ and $R^d$ together are a $C_4$-$C_8$ alkylene group; and each occurrence of D is independently a group of the formula

[chemical structures]

wherein
each occurrence of G is independently $C_1$-$C_{12}$ hydrocarbylene;
each occurrence of Q is independently $C_1$-$C_6$ alkylene or $C_6$-$C_{12}$ arylene, wherein a is 0 or 1;
each occurrence of A is independently a single bond or —O—;
each occurrence of J is independently a single bond, $C_1$-$C_6$ alkylene, or —(CH$_2$)$_n$NH(CH$_2$)$_n$(C=O)O— wherein n is 1 to 6; and
each occurrence of Z is independently of the formula

[chemical structure]

wherein
$W^a$ is O or S;
each of R and R' is independently hydrogen, $C_1$-$C_{12}$ hydrocarbyl, or $C_1$-$C_6$ hydrocarbylene, optionally wherein both R and R' together are a $C_2$-$C_8$ alkylene group; and
m is 0 or 1.

2. The capped poly(arylene ether) copolymer of claim 1, wherein
$Q^{1a}$ is $C_1$-$C_{12}$ primary alkyl;
$Q^{1b}$ is $C_1$-$C_{12}$ alkyl;
$Q^2$ is hydrogen; and
$R^1$, $R^2$, $R^3$, and $R^4$ are each independently hydrogen, halogen, or $C_1$-$C_{12}$ alkyl.

3. The capped poly(arylene ether) copolymer of claim 1, wherein
$Q^{1a}$ is $C_1$-$C_6$ primary alkyl;
$Q^{1b}$ is $C_1$-$C_6$ alkyl;
$Q^2$ is hydrogen; and
$R^1$, $R^2$, $R^3$, and $R^4$ are each independently hydrogen or $C_1$-$C_6$ alkyl.

4. The capped poly(arylene ether) copolymer of claim 1, wherein
$Q^{1a}$ and $Q^{1b}$ are methyl;
$Q^2$ is hydrogen; and
$R^1$, $R^2$, $R^3$, and $R^4$ are each independently hydrogen or $C_1$-$C_6$ alkyl.

5. The capped poly(arylene ether) copolymer of claim 1, wherein $R^5$ is a ($C_1$-$C_6$-hydrocarbyl)($C_1$-$C_6$-hydrocarbyl)aminomethylene group.

6. The capped poly(arylene ether) copolymer of claim 1, wherein
$Q^{1a}$ is $C_1$-$C_6$ primary alkyl;
$Q^{1b}$ is $C_1$-$C_6$ alkyl;
$Q^2$ is hydrogen;
$R^1$, $R^2$, $R^3$, and $R^4$ are each independently hydrogen or $C_1$-$C_6$ alkyl; and
$R^5$ is a ($C_1$-$C_6$-alkyl)($C_1$-$C_6$-alkyl)aminomethylene group.

7. The capped poly(arylene ether) copolymer of claim 1, wherein the capped poly(arylene ether) copolymer is of the formula

[structure]

8. The capped poly(arylene ether) copolymer of claim 1, wherein
each occurrence of Q is independently $C_1$-$C_3$ alkylene or $C_6$ phenylene;
each occurrence of J is independently a single bond or —$(CH_2)_n$NH$(CH_2)_n$(C=O)O—; and
n is 1 to 3.

9. The capped poly(arylene ether) copolymer of claim 1, wherein D is a group of the formulas

[structures]

10. The capped poly(arylene ether) copolymer of claim 1, wherein
$W^a$ is O; and
R and R' are independently hydrogen or $C_1$-$C_6$ alkyl.

11. A process for forming the capped poly(arylene ether) copolymer of claim 1, the process comprising:
reacting a capping agent and an uncapped poly(arylene ether) copolymer comprising a phenolic end group under conditions effective to provide a reaction mixture comprising the capped poly(arylene ether) copolymer.

12. The process of claim 11, wherein the capping agent comprises a compound of the formula

[structures]

wherein
each occurrence of G is independently $C_1$-$C_{12}$ hydrocarbylene;
each occurrence of Q is independently $C_1$-$C_6$ alkylene or $C_6$-$C_{12}$ arylene, wherein a is 0 or 1;
A is a single bond or —O—;
J is a single bond, $C_1$-$C_6$ alkylene, or —$(CH_2)_n$NH$(CH_2)_n$(C=O)O— wherein n is 1 to 6;
X is halogen, tosylate, mesylate, or triflate;
R" is $C_1$-$C_6$ alkyl; and
each occurrence of Z is independently

[structure]

wherein

W$^a$ is O or S;

each of R and R' is independently hydrogen, C$_1$-C$_{12}$ hydrocarbyl, or C$_1$-C$_6$ hydrocarbylene, optionally wherein both R and R' together are a C$_2$-C$_8$ alkylene group; and m is 0 or 1.

13. The process of claim 12, wherein

X is a halogen;

each occurrence of G is independently C$_{1-3}$ hydrocarbylene;

each occurrence of Q is independently C$_1$-C$_3$ alkylene or phenylene;

J is a single bond, C$_1$-C$_3$ alkylene, or —(CH$_2$)$_n$NH(CH$_2$)$_n$(C=O)O— wherein n is 1 to 3;

W$^a$ is O;

each of R and R' is independently hydrogen or C$_1$-C$_6$ hydrocarbyl; and m is 0 or 1.

14. The process of claim 13, wherein

X is Cl;

J is C$_1$-C$_3$ alkylene or —(CH$_2$)$_n$NH(CH$_2$)$_n$(C=O)O— wherein n is 1 or 2;

R and R' are hydrogen; and m is 1.

15. The process of claim 11, wherein the uncapped poly(arylene ether) copolymer has the formula

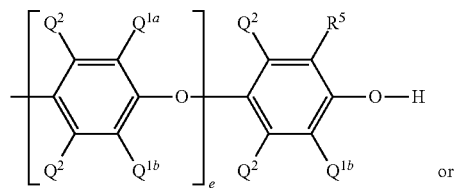

or

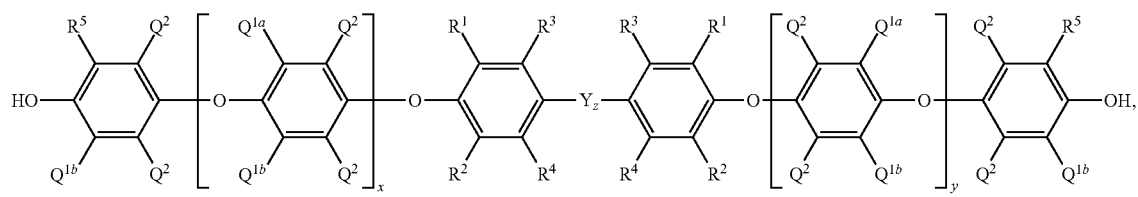

wherein

Q$^{1a}$ is a C$_1$-C$_{12}$ primary or secondary alkyl;

Q$^{1b}$ is halogen, C$_1$-C$_{12}$ hydrocarbyl provided that the hydrocarbyl group is not tertiary hydrocarbyl, C$_1$-C$_{12}$ hydrocarbylthio, C$_1$-C$_{12}$ hydrocarbyloxy, or C$_2$-C$_{12}$ halohydrocarbyloxy wherein at least two carbon atoms separate the halogen and oxygen atoms;

each occurrence of Q$^2$ is independently hydrogen, halogen, unsubstituted or substituted C$_1$-C$_{12}$ hydrocarbyl provided that the hydrocarbyl group is not tertiary hydrocarbyl, C$_1$-C$_{12}$ hydrocarbylthio, C$_1$-C$_{12}$ hydrocarbyloxy, or C$_2$-C$_{12}$ halohydrocarbyloxy wherein at least two carbon atoms separate the halogen and oxygen atoms;

each occurrence of R$^1$, R$^2$, R$^3$, and R$^4$ is independently hydrogen, halogen, C$_1$-C$_{12}$ hydrocarbyl provided that the hydrocarbyl group is not tertiary hydrocarbyl, C$_1$-C$_{12}$ hydrocarbylthio, C$_1$-C$_{12}$ hydrocarbyloxy, or C$_2$-C$_{12}$ halohydrocarbyloxy wherein at least two carbon atoms separate the halogen and oxygen atoms;

each occurrence of R$^5$ is independently Q$^{1a}$ or a (C$_1$-C$_6$-hydrocarbyl)(C$_1$-C$_6$-hydrocarbyl)aminomethylene group;

z is 0 or 1;

x and y represent the relative mole ratios of the arylene ether units or e is the number of moles of the arylene ether unit; and Y is divalent linking group of the formula

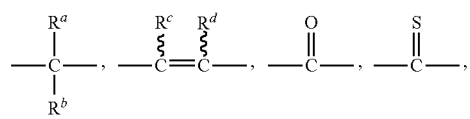

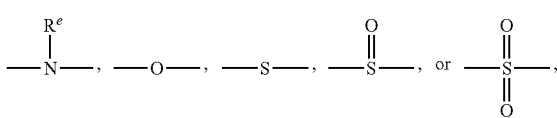

wherein each occurrence of R$^a$, R$^b$, R$^c$, R$^d$, and R$^e$ is independently hydrogen, C$_1$-C$_{12}$ hydrocarbyl, or C$_1$-C$_6$ hydrocarbylene, optionally wherein R$^a$ and R$^b$ or R$^c$ and R$^d$ together are a C$_4$-C$_8$ alkylene group.

16. The process of claim 15, wherein

Q$^{1a}$ is C$_1$-C$_{12}$ primary alkyl;

Q$^{1b}$ is C$_1$-C$_{12}$ alkyl;

Q$^2$ is hydrogen; and

R$^1$, R$^2$, R$^3$, and R$^4$ are each independently hydrogen, halogen, or C$_1$-C$_{12}$ alkyl.

17. The process of claim 11, wherein the reacting is in the presence of a capping catalyst.

18. The process of claim 11, further comprising reacting a monohydric phenol and a dihydric phenol under conditions effective to provide the uncapped poly(arylene ether) copolymer.

19. A curable composition comprising a thermosetting resin and the capped poly(arylene ether) copolymer of claim 1.

20. A cured composition obtained by heating the curable composition of claim 19 for a time and temperature sufficient to effect curing.

\* \* \* \* \*